Dec. 29, 1931.  M. H. HANSEN  1,838,941
SCALE
Filed Sept. 24, 1930
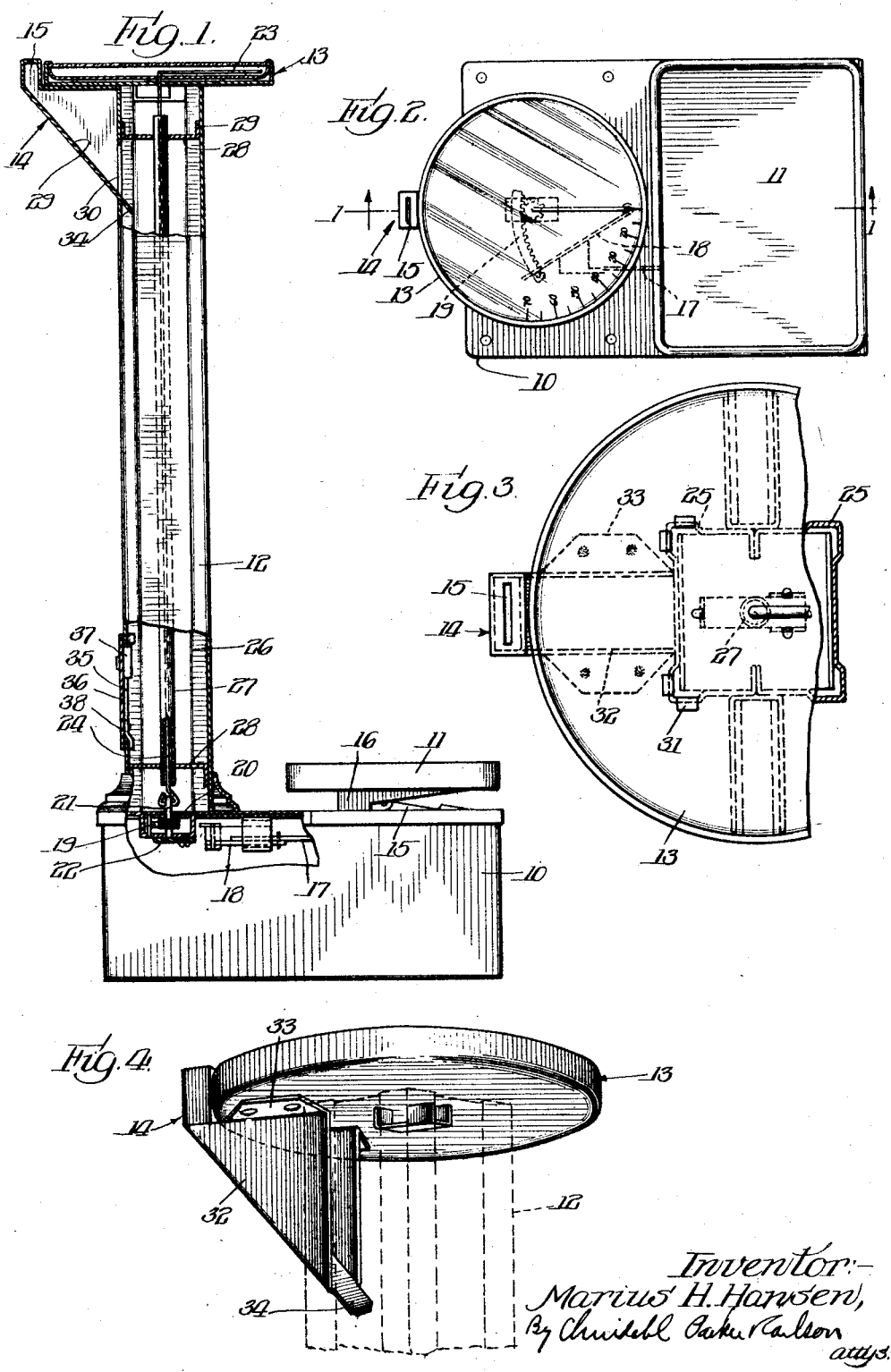
Inventor:-
Marius H. Hansen,
By Christehl Parker Carlson
attys.

Patented Dec. 29, 1931

1,838,941

UNITED STATES PATENT OFFICE

MARIUS H. HANSEN, OF CHICAGO, ILLINOIS, ASSIGNOR TO HANSON SCALE COMPANY, OF NEWARK, OHIO, A CORPORATION OF ILLINOIS

SCALE

Application filed September 24, 1930. Serial No. 485,481.

The invention relates generally to scales and more particularly to comparatively small scales of the platform type adapted for weighing persons.

The primary object of the present invention is to provide an accurate and durable scale of this type of economical construction, of reasonably small size and weight so as to be readily handled, with an elevated dial which may be easily read and which carries means providing a conveniently positioned aperture for receiving freely contributed coins, whereby to adapt the scale for use by charitable agencies as a means for collecting funds.

Another object is to provide a scale of this character in which the principal portion of the weighing mechanism is mounted within a base having a column upstanding therefrom and carrying a dial at the top thereof, a coin receiving means beside the dial arranged to discharge the coins directly into the interior of the column, and means within the column to protect the moving parts of the scale mechanism which extend between the base and the dial.

Other objects and advantages will become apparent from the following description taken in connection with the accompanying drawings, in which:

Figure 1 is a side elevational view of a scale embodying the invention in its preferred form, certain portions of the scale being shown in section along the line 1—1 of Fig. 2.

Fig. 2 is a plan view of the scale shown in Fig. 1.

Fig. 3 is an enlarged fragmental portion of the dial as shown in Fig. 2.

Fig. 4 is an enlarged perspective view showing the dial and the associated coin-receiving means, the upper portion of the column being shown in dotted outline.

While my invention is susceptible of embodiment in many different forms, I have shown in the drawings and will herein describe in detail one such embodiment, with the understanding that the present disclosure is to be considered as an exemplification of the principles of the invention and is not intended to limit the invention to the embodiment illustrated. The scope of the invention will be pointed out in the appended claims.

In the embodiment illustrated the invention is embodied in a scale having a box-like base 10 with a vertically movable platform 11 on one end and an upstanding, hollow column 12 at the other which carries at its upper end a glass covered dial 13, together with a member 14 providing a conveniently positioned coin-receiving slot 15 into which coins may be dropped by persons being weighed upon the scale.

In order that the scale may be economically constructed and of reasonably small size it is desirable that the principal portion of the weighing mechanism be located within the base 10 and that the space within the column 12 serve as a container to receive the coins deposited in the slot 15. With such an arrangement the various parts of the base column and dial may be made of sheet metal so as to produce a comparatively light and economical structure. It also results in a scale having a low center of gravity so that the scale is made stable without the necessity of providing added weight for this particular purpose.

The weighing mechanism is preferably of a well known construction of the general type disclosed in my prior Patent No. 1,638,260, issued August 9, 1927, and, as shown herein, this weighing mechanism is actuated by vertical stems 16 which support the platform 11 and act in conjunction with pivoted levers 15 extending into the base 10. Actuation of the weighing mechanism (not shown) by movement of the platform 11 serves to move correspondingly a horizontal rod 17, through which the indicating means is operated. As shown in Figs. 1 and 2, the rod 17 extends rearwardly within the base 10 and transmits movement to a pivoted, horizontal lever 18 and internal gear segment 19 carried thereby. The segment 19 meshes with a gear 20 fixed on a rotatably mounted, vertical shaft 21 which is in turn supported on a suitable thrust bearing formed in a bracket 22 mounted within the base. Thus the vertical shaft 21 is rotated in an amount proportional to the weight on the platform 11 and this movement is indicated on the dial 13 by means of a pointer 23. As herein shown the pointer 23 is an integral part of a wire 24 which extends downwardly through the column 12 and is connected at its lower end to the shaft 21 so as to be supported and rotated thereby.

As above pointed out, the column 12 preferably serves as a container for receiving the coins, and as shown herein, the column is of square cross section formed from two sheet metal channel sections 25 (Fig. 3) which may be secured together by means such as spot welding. With this construction the walls of the column serve to define the sides of a chamber 26 within the column, and to insure proper operation of the scale, the wire 24 within the chamber 26 is shielded throughout the major portion of its length by a tube 27 which surrounds the wire. The tube 27 terminates short of the dial 13 and the shaft 21 and is supported in the desired coaxial relation to the wire by means of a pair of horizontal walls 28 extending across the column adjacent to its top and bottom. The tube 27 in the present case extends through openings in the walls 28 and is held in the desired longitudinal position by the friction between the parts. To support the walls 28, flanges 29 are formed thereon at two opposite edges of each wall and these flanges are secured to the sides of the column 12 preferably by spot welding.

When a horizontal dial is used, the scale may be made of relatively small size and weight, and the dial may be supported in an elevated position wherein the dial is easily readable. It will also be noted that the upstanding column makes it possible to support the coin receiving means so that it is conveniently accessible. It is, of course, desirable to locate the coin receiving opening 15 in a conspicuous as well as conveniently accessible position and the member 14 is therefore mounted so as to locate its aperture 15 at one side of the dial 12 as shown in Figs. 1 and 2. Since the eyes of the user are naturally directed toward the dial, the coin-receiving opening will at once be seen and the purpose of the scale called to the attention of the user. Accordingly the member 14 is constructed to provide a downwardly sloping chute or slideway 29 arranged to direct the coins from the slot 15 toward the column and into the coin-receiving chamber 26 through an opening 30 formed in the side of the column below the upper wall 28, as shown in Fig. 1 of the drawings.

It will be noted that the dial 13 is formed from sheet metal and is attached to the top of the column 12 by tongues 31 (Fig. 3) projecting through the metal portion of the dial and clinched on the top of this metal portion. With this construction the side walls 32 of the member 14 may have flanges 33 at their upper edges adapted to be fixed by spot welding to the lower side of the dial. The dial 13 and the member 14 may therefore be separately assembled and then secured in place on the top of the column with the vertical edges of the side walls 32 abutting the outer surface of the column so as to provide a closed passage to conduct coins from the slot 15 into the chamber 26. The structure may be materially strengthened by providing a tongue 34 at the lower extremity of the chute 29 which forms a continuation of the bottom wall of the chute and is adapted to abut the side and the lower edges of the opening 30 and to project a short distance into the chamber 26.

To provide for removal of coins from the chamber 26, an opening 35 is formed in the side of the column (Fig. 1) which opening is adapted to be closed by a removable plate 36 having a lock 37 and a lug 38 thereon for engaging the wall of the column to hold the plate in position.

It will be seen that by forming the member 14 so that it may be secured to the dial 13 prior to the mounting of the dial, the assembly of the scale is simplified. Furthermore the engagement of the lower part of the member 14 with the edges of the opening 30, serves to strengthen the structure.

It will be apparent that the scale provided is one which is particularly suited for use in connecting funds for charitable agencies since it is of economical yet durable construction.

The size and weight of the device are maintained at the minimum due to the use of the side walls of the column to define certain limits of the coin receiving chamber, while by the use of a simple form of protecting means within the column, the operating parts of the device are protected and proper operation insured.

The motion transmitting connection shown herein between the weighing mechanism and the indicator, and the particular form of the column are claimed in my co-pending application Serial No. 349,102, filed March 22, 1929.

I claim as my invention:

1. A scale having, in combination, a base, a movable platform on said base, weighing mechanism within the base, a hollow column extending upwardly from the base, a horizontal dial on the top of said column, means providing a coin-receiving slot at one side of said dial and a chute sloping downwardly from said slot arranged to discharge coins into said column, a pointer movably supported over said dial, means extending through said column and operatively connecting said weighing mechanism to the pointer, and means within said column acting to protect said connecting means against coins discharged from said chute into the column.

2. A scale having a base with weighing mechanism therein and an operating platform for said mechanism, an upstanding hollow column having side walls forming the outer sides of a chamber, transverse walls within the column forming the top and bottom of the chamber, an indicator carried at the top of the column, motion transmitting means extending from said weighing mechanism to said indicator through said column and said chamber, walls supported by said transverse walls within the chamber surrounding said motion-transmitting means in spaced relation thereto and serving to protect said means, and means providing a slot adjacent the upper end of the column and arranged to receive coins and conduct the same into said chamber.

3. The combination of a scale having a box-like base with platform-operated weighing mechanism therein, a hollow column extending upwardly from said base, an indicating device carried by the column, means extending through the column and operatively connecting said weighing mechanism and said indicating device, a transverse wall extending across said column adjacent its lower end and cooperating with the walls of the column to define a coin-receiving chamber, a tube surrounding said connecting means and extending upwardly in said chamber from said transverse wall to a point adjacent the top of the column, means supporting said tube against movement, and means providing a coin-receiving opening arranged to discharge coins into said chamber below the upper end of said tube.

4. A scale having a base with platform-actuated weighing mechanism therein, a column on said base, an indicating device on the column, a connection between the weighing mechanism and said indicating device extending through the column, a transverse wall adjacent to the bottom of the column, stationary means surrounding and protecting said connection within the column, means providing a coin-receiving slot arranged to discharge coins into said column adjacent to the top thereof, said column having an opening therein just above said transverse wall, and a removable plate for closing said opening.

5. In combination with a sheet metal scale column having prongs projecting from its upper end and an aperture in one side adjacent to said upper end, a sheet metal plate apertured to receive said prongs and adapted to rest horizontally on the top of said column, a sheet metal member formed to provide a coin-receiving slot and an angularly disposed chute leading downwardly from said slot, said member having triangularly shaped side walls for said chute, one edge of each of said walls being secured to said plate to position said slot at one side of the plate and the other edge of each of said walls being adapted to abut the side of the column when said plate is positioned on said column, and a tongue forming a continuation of the chute adapted to extend into the opening in said column to hold the lower portion of said member in position.

In testimony whereof, I have hereunto affixed my signature.

MARIUS H. HANSEN.